US008922676B2

(12) United States Patent
McNaughton

(10) Patent No.: US 8,922,676 B2
(45) Date of Patent: Dec. 30, 2014

(54) VIDEO FRAME BUFFER

(75) Inventor: Craig McNaughton, Fife (GB)

(73) Assignee: STMicroelectronics (Research & Development) Limited, Marlow Bucks (GB)

(*) Notice: Subject to any disclaimer, the term of this patent is extended or adjusted under 35 U.S.C. 154(b) by 518 days.

(21) Appl. No.: 11/838,402

(22) Filed: Aug. 14, 2007

(65) Prior Publication Data

US 2008/0049120 A1    Feb. 28, 2008

(30) Foreign Application Priority Data

Aug. 15, 2006 (EP) .................................... 06270079

(51) Int. Cl.
H04N 5/76 (2006.01)
H04N 5/77 (2006.01)

(52) U.S. Cl.
CPC ...................................... H04N 5/77 (2013.01)
USPC .................................................... 348/231.99

(58) Field of Classification Search
USPC ..................................... 348/231.99, 571–721
See application file for complete search history.

(56) References Cited

U.S. PATENT DOCUMENTS

| 5,347,310 | A | * | 9/1994 | Yamada et al. | 375/240.03 |
| 5,585,856 | A | | 12/1996 | Nakaya et al. | 348/441 |
| 6,784,941 | B1 | | 8/2004 | Su et al. | 348/445 |
| 7,522,187 | B2 | * | 4/2009 | Fujiwara | 348/207.11 |
| 7,567,297 | B2 | * | 7/2009 | Worry et al. | 348/578 |
| 2002/0080250 | A1 | | 6/2002 | Ogawa et al. | 348/232 |
| 2003/0085988 | A1 | * | 5/2003 | Fujiwara | 348/14.1 |
| 2005/0160406 | A1 | * | 7/2005 | Duncan et al. | 717/127 |
| 2006/0153296 | A1 | * | 7/2006 | Deng | 375/240.12 |

FOREIGN PATENT DOCUMENTS

| EP | 0375334 | 6/1990 | H04N 5/783 |
| EP | 1549040 | 6/2005 | H04N 1/04 |
| WO | 2004/025652 | 3/2004 | G11B 27/34 |

* cited by examiner

Primary Examiner — Sinh Tran
Assistant Examiner — Mark Monk
(74) Attorney, Agent, or Firm — Allen, Dyer, Doppelt, Milbrath & Gilchrist, P.A.

(57) ABSTRACT

A video frame buffer may enable a high resolution image sensor video stream to be transmitted on a standard communication link at a high frame rate. The buffer may include an image stream input for receiving image frames from the image sensor, and a memory for buffering image frames. A frame processor manipulates portions of each image frame before passing the modified image frame to the memory which selectively buffers the frames before outputting the frames to a communication output. The video frame buffer may be implemented in a FPGA along with a DDR SDRAM memory. The communication link may be a USB2 communication link.

26 Claims, 4 Drawing Sheets

| MODE | INPUT | OUTPUT |
|---|---|---|
| CCP PASS THRU | | SOF / LINE 1 / SOL / FRAME OF IMAGE DATA / EOL / LAST LINE / EOF / 4 CHARACTER BYTES/LINE / LINE BLANKING PERIOD / FRAME BLANKING PERIOD |
| CCP EMBEDDED (1) | SOF / LINE 1 / SOL / FRAME OF IMAGE DATA / EOL / LAST LINE / EOF / 4 CHARACTER BYTES/LINE / LINE BLANKING PERIOD / FRAME BLANKING PERIOD | SOF / LINE 1 / SOL / FRAME OF IMAGE DATA / EOL / LAST LINE / EOF |
| CCP EMBEDDED (2) | | SOF / LINE 1 / FRAME OF IMAGE DATA / LAST LINE / EOF |
| CCP EMBEDDED (3) | | SOF / LINE 1 / SOL / FRAME OF IMAGE DATA / EOL / LAST LINE / EOF / 4 CHARACTER BYTES/LINE |

*FIG. 4*

| MODE | INPUT | OUTPUT |
|---|---|---|
| CCP JPEG8 | FFD8 / JPEG8 DATA / FFD9 / UNDEFINED DATA | FFD8 / JPEG DATA / FFD9 |
| ITU JPEG PASS THRU | | FFD8 / JPEG DATA / FFD9 |

*FIG. 5*

| MODE | INPUT | OUTPUT |
|---|---|---|
| ITU EXTERNAL | HS ⎡⎻⎻⎻⎻⎻⎤<br>0 ⎣SOF│LINE 1⎦<br>FRAME OF IMAGE DATA<br>LAST LINE│EOF<br>VS 1⎿⎻⎻⎻⎯0 | SOF│LINE 1<br>FRAME OF IMAGE DATA<br>LAST LINE│EOF |

FIG. 6

| MODE | INPUT | OUTPUT |
|---|---|---|
| ITU EMBEDDED 1 | SAV 80│FRAME OF IMAGE DATA│EAV 9D  LINE 1 ... LINE 480<br>SAV AB│FRAME BLANKING PERIOD│EAV B6<br>LINE BLANKING PERIOD | SOF│LINE 1<br>FRAME OF IMAGE DATA<br>LAST LINE |

FIG. 7

| MODE | INPUT | OUTPUT |
|---|---|---|
| ITU EMBEDDED 2 (FRAME STRUCTURE 1) | SOF│LINE 1│EOL<br>SOL│FRAME OF IMAGE DATA│<br>LAST LINE│EOF<br>FRAME BLANKING PERIOD<br>4 CHARACTER BYTES/LINE<br>LINE BLANKING PERIOD | SOF│LINE 1<br>FRAME OF IMAGE DATA<br>LAST LINE |
| ITU EMBEDDED 2 (FRAME STRUCTURE 2) | | SOF│LINE 1<br>SOL│FRAME OF IMAGE DATA│EOL<br>LAST LINE│EOF |

FIG. 8

VIDEO FRAME BUFFER

FIELD OF THE INVENTION

The present invention relates to video frame buffers, and more particularly, but not exclusively, to a video frame buffer for receiving images from an image stream from an image sensor and converting the image stream to an alternative format.

BACKGROUND OF THE INVENTION

Images, as well as video streams, direct from image sensors are usually provided in one of several formats. These formats include Compact Camera Port (CCP), CCP Joint Photographic Experts Group (JPEG), International Telecommunications Union (ITU) and ITU JPEG. An image frame that is output from an image sensor in one of these formats contains additional information beyond that of simply the data of the image.

For example, referring to FIG. 1, a typical CCP formatted frame 10 is shown. The frame 10 begins with a start of frame data SOF indicating to any serial reader of the frame where the first line of the frame begins. The first line is then followed by end of line data EOL so the serial reader now knows that it has the first line of the frame. Following the end of line data EOL, checksum data is provided to verify the integrity of the image data contained in the first line. Following the checksum data is a blank period separating the data associated with the first line to that of the second. This data area is known as the line blanking period. Start of line data SOL then indicates the beginning of a second line of data. This is then followed by the image data, the end of line data EOL, a checksum and then the line blanking period. The same order continues for each line until the last line, which instead of the end of line data EOL has the end of frame data EOF.

Following the last line, including its line blanking period, is another blank period separating the current frame from the next one, which is known as the frame blanking period. Blanking periods are introduced into image frames from an image sensor to allow for image scaling. The blank period provides a buffer for timing and scaling, and for delays in electronics in the image sensor or coprocessor to allow time for the electronics to colorize the image (raw outputs from an image sensor are bayer images).

When image streams are received by a computer over a communication link, such as a USB2 (Universal Serial Bus 2) communication link, in one of these formats at least two problems effect the quality of the video image stream displayed. First, insufficient bandwidth is available in a USB2 communication link to transmit all image frames at the rate at which the sensor is capable (for a relatively high resolution image sensor, such as one having 1600×1200 pixels), which is typically 30 frames per second. As such, the image sensor has to be de-rated by reducing the output frame rate so that all produced images can be received.

As a result of the slower frame rate, motion blur occurs in the displayed video, and therefore, does not represent the quality of the image stream that can be produced. Second, when images are transmitted in one of these formats over a communication channel, such as a USB2 link, the software in the receiving system is required to manipulate the image data for removing the portions which are not required for display. This operation further limits the frame rate at which images can be displayed on the receiving system.

SUMMARY OF THE INVENTION

According to a first aspect, a communication link video frame buffer for an image sensor comprises an image stream input for receiving image frames from the image sensor, memory means or a memory for buffering image frames, and frame processing means or a frame processor. The frame processing means may manipulate portions of each image frame before passing the modified image frame to the memory means which selectively buffers (i.e., where necessary) the frames before outputting the frames to a communication output.

The frame processing means may remove any blanking or padding periods before passing the modified image frame to the memory means. The frame processing means may comprise an input for receiving an image frame stream, selection means or a selector for selecting from a set of pre-defined output frame formats, and memory means or a memory for storing pre-defined sets of characters. Search means or a searcher may identify in the image frame stream one or more of the pre-defined sets of characters according to the selected output frame format, and modification means or a modifier may remove the identified sets of characters or replace them with an alternative pre-defined set of characters.

The set of pre-defined output frame formats may be compatible with USB video formats. The frame processing means may be implemented in a Field Programmable Gate Array. The communication link may be a Universal Serial Bus 2 (USB2) communication link.

According to a second aspect, video frame processing means or a video frame processor may comprise an input for receiving an image frame stream, selection means or a selector for selecting from a set of pre-defined output frame formats, and memory means or a memory for storing pre-defined sets of characters. Search means or a searcher may identify in the image frame stream one or more of the pre-defined sets of characters according to the selected output frame format, and modification means or a modifier may remove the identified sets of characters or replace with an alternative pre-defined set of characters.

The set of pre-defined output frame formats may be compatible with USB video formats. The frame processing means may be implemented in a Field Programmable Gate Array.

BRIEF DESCRIPTION OF THE DRAWINGS

Embodiments of the present invention will now be described, by way of example only, with reference to the accompanying drawings, in which;

FIG. 4 illustrates a CCP image frame before and after processing according to the present invention;

FIG. 5 illustrates a CCP JPEG8 image frame or ITU JPEG8 image frame before and after processing according to the present invention;

FIG. 6 illustrates an ITU External image frame before and after processing according to the present invention;

FIG. 7 illustrates an ITU Embedded 1 image frame before and after processing according to the present invention; and FIG. 8 illustrates an ITU Embedded 2 image frame before and after processing according to the present invention.

DETAILED DESCRIPTION OF THE PREFERRED EMBODIMENTS

The present invention is particularly applicable where full frame rate video from a high resolution image sensor is required to be transmitted over a communication link. As image sensor resolution continues to gets larger, the size of each individual image in storage and transmission terms has increased dramatically. For example, Compact Camera Port (CCP) images cannot be transmitted over a USB2 (Universal Serial Bus 2) link at a full frame rate of 30 frames per second for an image sensor having a resolution of 1600×1200 without any management of the image frames. Furthermore, even at a lower frame rate from a de-rated image sensor, current computing processor power cannot manipulate the image frames quickly enough to provide a simple video stream without the blanking periods, or other frame information on a computer connected to an image sensor over a USB2 communication link.

Figure 1:
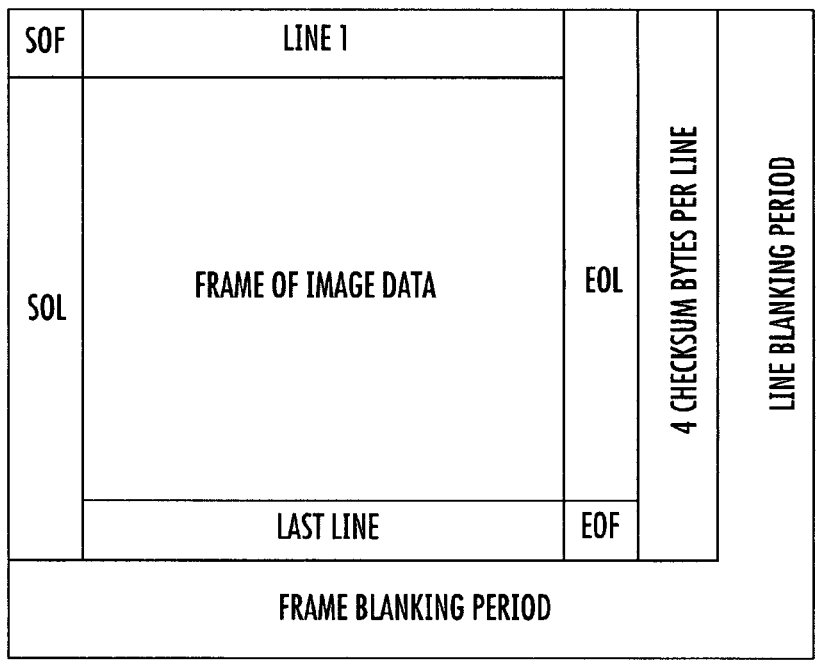
FIG. 1 illustrates data organization in a CCP image frame according to the prior art.
Figure 2:
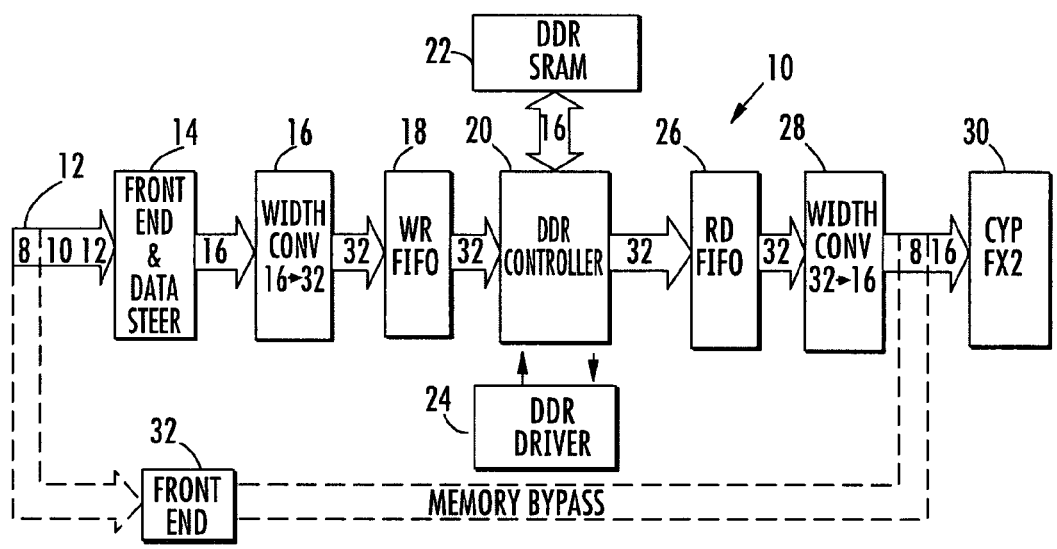
FIG. 2 illustrates a block diagram of a video frame buffer according to the present invention.

As such, the illustrated video frame buffer 10 overcomes the problems associated with limited bandwidth and insufficient computing processor speed to display full frame rate video from an image sensor. Referring to FIG. 2, a video frame buffer 10 is shown having a video image stream input 12 from an image sensor (not shown). Frame processing means 14 processes the video image stream as described below. In this example, the frame processing means also converts 10 and 12 bit data to 16 bit data before the 16 bit data is passed to an input width conversion module 16 which converts the 16 bit data to 32 bit data. The input width conversion module 16 passes the 32 bit data to an input WR FIFO (WRite First In First Out) module 18 which, in turn, passes the 32 bit data to a memory controller 20.

The input width conversion module 16 and input WR FIFO module 18 manipulate the data into the correct format for the memory controller 20. In this example, the memory controller 20 is a DDR (Double Data Rate) memory controller which accepts and outputs 32 bit data. Associated with the memory controller 20 is a memory driver 24, which controls the timing of writes and reads to/from memory, and a memory 22 which in this case is a DDR SDRAM (Synchronous Dynamic Random Access Memory). Data received by the memory controller 20 is buffered in the memory 22.

The memory 22, and associated driver 24 and controller 20 enable the full frame rate of the image sensor to be captured. The video frames captured in the memory 22 are then read out as fast as the communication link allows.

Data is output from the memory 22 when required by the memory controller 20, which in turn outputs the 32 bit data to an output RD FIFO 30 (ReaD FIFO) module 26 and then to an output width conversion module 28, which converts the 32 bits data back to 16 bit. The 16 bit data is then passed to a USB interface 30, which in this case is a Cypress FX2 USB interface.

In an alternative embodiment, buffering is removed from the process altogether, as shown by the dashed lines of the alternative embodiment, and the frame processing means 32 simply performs image stream processing before outputting the data to the USB interface 30. The operations of the frame processing means is described below.

Figure 3:
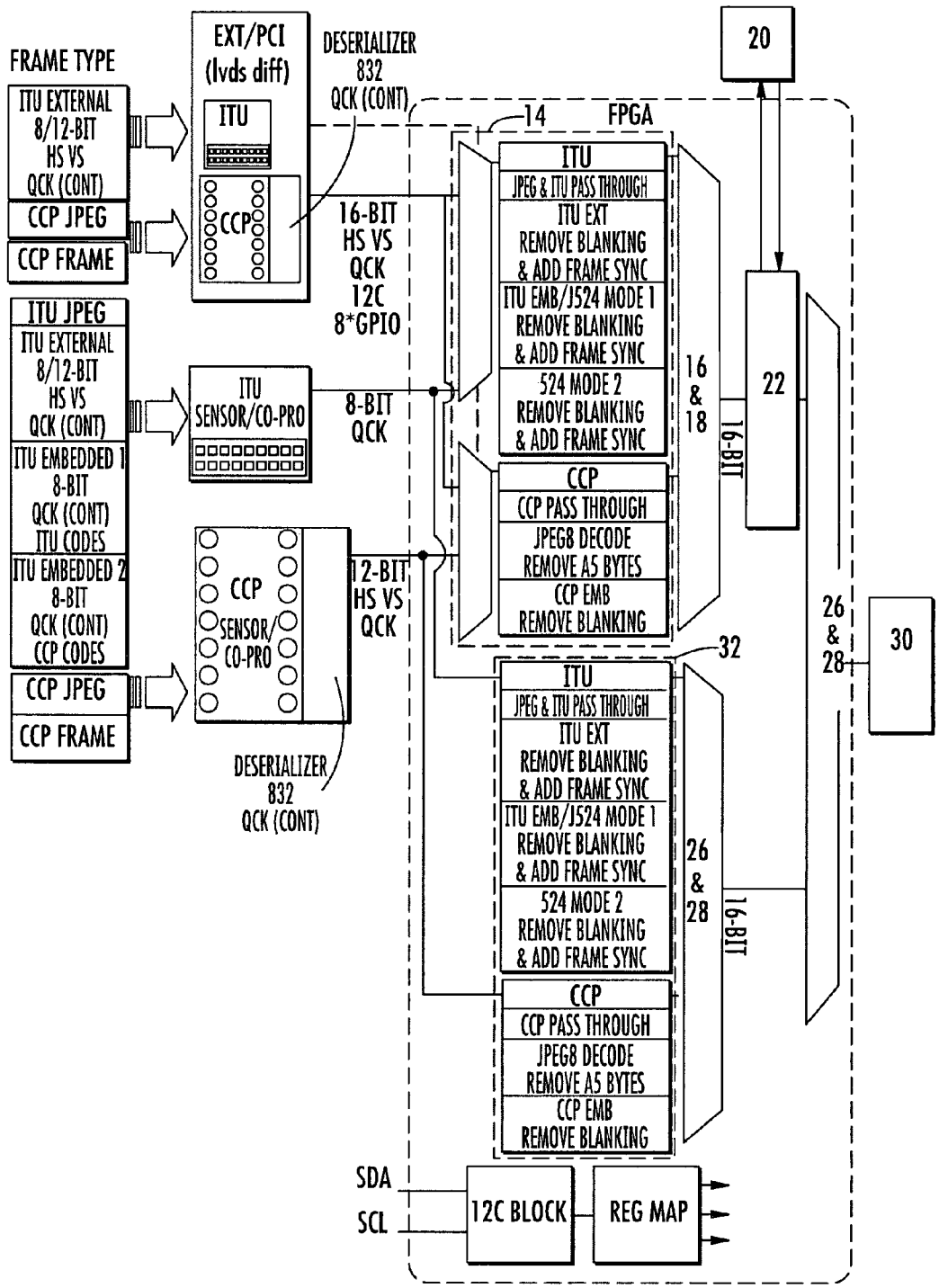
FIG. 3 illustrates a Field Programmable Gate Array (FPGA) implementation according to the present invention.

Referring now to FIG. 3, a FPGA (Field Programmable Gate Array) implementation is shown. Components common with that of FIG. 2 are identically numbered. In this example, three different parallel data inputs are shown: CCP format from an image sensor/co-processor via a deserializer, such as the STCCP832 deserializer device; ITU format from an image sensor/coprocessor; and external from an external system also providing CCP and ITU data.

Data flow through the FPGA is controlled by MUXs (multiplexers) and DEMUXs (demultiplexers) via an on chip I2C (Inter-integrated Circuit) and Regmap block. The Regmap block contains all of the I2C registers used to control the design.

Frame processing means 14 and frame processing means 32 perform the same functions although the latter bypasses the memory means 20, 22, 24. As such, the following description will apply to both frame processing means 14, 32.

The frame processing means is enabled to perform formatting on image frames from a first format to a second format. For example, as shown in FIG. 4 (CCP Embedded (3)), a CCP input can be formatted to reduce the overall amount of information of the image frame, and the frame processing means removes blanking period from the image frame. This step can be performed in a blanking removal block implemented in a FPGA. The frame processing means is set to the appropriate in coming frame format and the desired outgoing frame format.

Furthermore, the frame processing means can also remove or alter other parts of the image frame, as required. For example, checksum data at the end of each line can be removed, end of line and start of line data can be removed or USB synchronization codes can be inserted. The frame processing means processes image frames by searching the incoming bit streams for pre-defined sets of characters or markers, and either removing or replacing those markers according to the desired output image frame.

Referring specifically to FIG. 4, a CCP frame shown in the input column can be processed in one of four ways. First, as shown in the first row, the image frame can be allowed to pass through without modification. Secondly, as shown in the second row, line and frame blanking periods as well as checksum data is removed to leave an simple image frame.

Thirdly, as shown in the third row, frame and line blanking periods, checksum data and start of line and end of line data are removed. In this case, as the end of line data has been removed, USB synchronization codes are inserted. Fourthly, as shown in the fourth row, line and frame blanking periods are removed.

Referring now to FIG. 5, a CCP JPEG8 frame, which corresponds to a JPEG8 frame, is shown in the input column. JPEG8 image frames do not contain line and frame blanking periods or start of frame and end of frame markers. However, they do contain padding bytes, which are inserted during encoding where the data stream contains a CCP synchronization code to prevent a genuine bit sequence from being interpreted as a marker (due to its serial nature, the encoder checks the data at a bit boundary), as well as other undefined data regions. As such, the frame processing means is enabled to remove the undefined data regions as well as the padding bytes to produce the output frame shown in the output column for both CCP JPEG8 and ITU JPEG8.

Referring to FIG. 6, an ITU External frame is shown, which has additional vertical and horizontal synchronization lines rather than markers as in other ITU formats. In this example, the synchronization information is removed and is replaced with USB synchronization code.

Referring to FIG. 7, an ITU embedded 1 frame is shown, in which there are embedded codes but no unique SOF/EOF markers. As shown in the first row, frame and line blanking are removed and a SOF marker is inserted into the frame.

Referring to FIG. 8, an ITU embedded 2 frame is shown, which has the same structure as a CCP frame but is presented in parallel rather than in serial, as a CCP frame is. The first row shows that a frame can be generated with all frame and line blanking periods removed as well as EOL, SOL and EOF markers and the checksum data. The second row shows that an alternative frame output frame can be generated with only the frame and line blanking periods and the checksum data removed.

The above described video frame buffer provides a significant speed advantage over the prior art. This is particularly the case where large resolution image sensors are providing high frame rate video. The video frame buffer enables the image quality and frame rate of the image sensor to be fully utilized. Improvements and modifications may be incorporated without departing from the scope of the present invention.

That which is claimed:

1. A video frame buffer comprising:
an image stream input for receiving image frames from an image sensor over a communication link, with the image frames having an input first frame format and comprising blanking;
a frame processor for modifying the received image frames to an output second frame format by removing the blanking to reduce an overall amount of information in the received image frames, with said frame processor being set to the input first frame format and the output second frame format;
a memory controller for receiving the modified image frame;
a memory for selectively buffering the modified image frames before outputting the modified image frames in the second frame format;
a memory driver coupled to said memory controller for controlling timing of writing to said memory and reading from said memory;
a communication output for receiving the modified image frames in the second frame format from said memory; and
a second frame processor coupled between said image stream input and said communication output so as to selectively bypass said memory, said memory driver and said memory controller, said second frame processor for modifying the received image frames to the output second frame format by removing the blanking to reduce the overall amount of information in the received image frames, with said second frame processor being set to the input first frame format and the output second frame format.

2. The video frame buffer as in claim 1, wherein said frame processor removes at least one of line and frame blanking.

3. The video frame buffer as in claim 1, wherein said frame processor comprises: a selector for selecting from a set of output second frame formats; a memory for storing sets of characters; a searcher for identifying in the received image frames at least one of the sets of characters according to the selected output second frame format; and a modifier for removing the identified sets of characters or replacing with an alternative set of characters.

4. The video frame buffer as in claim 3, wherein the set of output second frame formats is compatible with Universal Serial Bus (USB) video formats.

5. The video frame buffer as in claim 1, wherein said frame processor is implemented in a Field Programmable Gate Array.

6. The video frame buffer as in claim 1, wherein the communication link comprises a Universal Serial Bus 2 (USB2) communication link.

7. A buffer comprising:
an input for receiving an image frame stream having an input first frame format;
a video frame processor comprising
a selector for selecting from a set of output second frame formats,
a memory for storing sets of characters;
a searcher for identifying in the image frame stream having the input first frame format at least one of the sets of characters according to the selected output second frame format,
a modifier for modifying the received image frame stream to the selected output second frame format by removing blanking therein to reduce an overall amount of information in the received image frame stream, and for modifying the identified sets of characters, with said modifier being set to the input first frame format and the output second frame format;
a memory controller for receiving the modified image frame;
a memory for selectively buffering the modified image frame stream before outputting the modified image frame stream in the second frame format; and
a memory driver coupled to said memory controller for controlling timing of writing to said memory and reading from said memory;
a communication output for receiving the modified image frames in the second frame format from said memory; and
a second frame processor coupled between said input and said communication output so as to selectively bypass said memory, said memory driver and said memory controller, said second frame processor for modifying the received image frames to the output second frame format by removing the blanking to reduce the overall amount of information in the received image frames, with said second frame processor being set to the input first frame format and the output second frame format.

8. The buffer as in claim 7, wherein said modifier modifies the identified sets of characters by removing the identified sets of characters or by replacing with an alternative set of characters.

9. The buffer as in claim 7, wherein the set of output second frame formats are compatible with Universal Serial Bus (USB) video formats.

10. The buffer as in claim 7, wherein said selector, said memory, said searcher and said modifier are configured as part of a Field Programmable Gate Array.

11. An apparatus comprising:
an image sensor for providing image streams having an input first frame format;
a communication link for receiving the image streams having the input first frame format from said image sensor; and
a video frame buffer coupled to said communication link and comprising
a frame processor for receiving image frames from said communication link, and modifying the received image frames having the input first frame format to an output second frame format by removing blanking therein to reduce an overall amount of information in the received image frames, with said frame processor being set to the input first frame format and the output second frame format,
a memory controller for receiving the modified image frame,
a memory for selectively buffering the modified image frames before outputting the modified image frames in the second frame format, and a memory driver coupled to said memory controller for controlling timing of writing to said memory and reading from said memory, a communication output for receiving the modified image frames in the second frame format from said memory, and a second frame processor coupled between said communication link and said communication output so as to selectively bypass said memory, said memory driver and said memory controller, said second frame processor for modifying the received image frames to the output second frame format by removing the blanking to reduce the overall amount of information in the received image frames, with said second frame processor being set to the input first frame format and the output second frame format.

12. The apparatus as in claim 11, wherein said frame processor removes at least one of line blanking or frame blanking.

13. The apparatus as in claim 11, wherein said frame processor is configured for performing the following: selecting from a set of output second frame formats; storing sets of characters; identifying in the received image frames at least one of the sets of characters according to the selected output second frame format; and removing the identified sets of characters or replacing with an alternative set of characters.

14. The apparatus as in claim 13, wherein the set of output second frame formats is compatible with Universal Serial Bus (USB) video formats.

15. The apparatus as in claim 11, wherein said frame processor comprises a Field Programmable Gate Array.

16. The apparatus as in claim 11, wherein said communication link comprises a Universal Serial Bus 2 (USB2) communication link.

17. A method for buffering image frames comprising:

receiving the image frames having an input first frame format from an image sensor over a communication link;

modifying the received image frames to an output second frame format using a frame processor by removing blanking therein to reduce an overall amount of information in the received image frames, with said frame processor being set to the input first frame format and the output second frame format;

receiving the modified image frame at a memory controller;

selectively buffering in a memory the modified image frames before outputting the modified image frames in the second frame format to a communication output;

controlling timing of writing to the memory and reading from the memory using a memory driver coupled to the memory controller; and selectively bypassing the memory, the memory driver and the memory controller so as to operate a second frame processor for modifying the received image frames to the output second frame format by removing the blanking to reduce the overall amount of information in the received image frames, with the second frame processor being set to the input first frame format and the output second frame format.

18. The method as in claim 17, wherein the frame processor removes at least one of line and frame blanking.

19. The method as in claim 17, wherein the modifying comprises: receiving the image frames; selecting from a set of output second frame formats; storing sets of characters; identifying in the received image frames at least one of the sets of characters according to the selected output second frame format; and removing the identified sets Of characters or replacing with an alternative set of characters.

20. The method as in claim 19, wherein the set of output second frame formats is compatible with Universal Serial Bus (USB) video formats.

21. The method as in claim 17, wherein the frame processor is implemented in a Field Programmable Gate Array.

22. The method as in claim 17, wherein the communication link comprises a Universal Serial Bus 2 (USB2) communication link.

23. The buffer as in claim 1, wherein said frame processor modifies portions of the input first frame format to the output second frame format that is different from the input first frame format.

24. The video frame processor as in claim 7, wherein said modifier modifies the identified sets of characters of the input first frame format to the selected output second frame format, with the selected output second frame format being different from the input first frame format.

25. The apparatus as in claim 11, wherein said frame processor modifies portions of the input first frame format to the output second frame format that is different from the input first frame format.

26. The method as in claim 17, wherein the modifying comprises modifying portions of the input first frame format to the output second frame format that is different from the input first frame format.

* * * * *